(12) United States Patent
Gandhi et al.

(10) Patent No.: US 7,260,534 B2
(45) Date of Patent: Aug. 21, 2007

(54) GRAPHICAL USER INTERFACE FOR DETERMINING SPEECH RECOGNITION ACCURACY

(75) Inventors: Shailesh B. Gandhi, Boca Raton, FL (US); Peeyush Jaiswal, Boca Raton, FL (US); Victor S. Moore, Boynton Beach, FL (US); Gregory L. Toon, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 10/196,017

(22) Filed: Jul. 16, 2002

(65) Prior Publication Data

US 2004/0015351 A1 Jan. 22, 2004

(51) Int. Cl.
*G10L 21/06* (2006.01)
*G10L 15/26* (2006.01)
(52) U.S. Cl. ...................... 704/270; 704/235
(58) Field of Classification Search ............. None
See application file for complete search history.

(56) References Cited

U.S. PATENT DOCUMENTS

| | | | |
|---|---|---|---|
| 4,914,704 A | 4/1990 | Cole et al. ............... 381/43 |
| 6,064,957 A | 5/2000 | Brandow et al. .......... 704/235 |
| 6,064,959 A | 5/2000 | Young et al. ............... 704/251 |
| 6,122,613 A | 9/2000 | Baker .................. 704/235 |
| 6,122,614 A | 9/2000 | Kahn et al. .............. 704/235 |
| 6,173,259 B1 | 1/2001 | Bijl et al. ............... 704/235 |
| 6,253,177 B1 | 6/2001 | Lewis et al. ............. 704/235 |
| 6,418,410 B1 | 7/2002 | Nassiff et al. ............ 704/251 |
| 7,103,542 B2* | 9/2006 | Doyle ................... 704/231 |
| 2002/0077833 A1* | 6/2002 | Arons et al. ............. 704/277 |
| 2002/0095290 A1* | 7/2002 | Kahn et al. .............. 704/260 |

FOREIGN PATENT DOCUMENTS

JP 11-088502 3/1999
JP 2003-308087 10/2003

OTHER PUBLICATIONS

R. M. Goldwyn, *IBM Technical Disclosure Bulletin*, IBM Corporation, vol. 37, No. 10, p. 391 (Oct. 1994).

* cited by examiner

*Primary Examiner*—David Hudspeth
*Assistant Examiner*—Matthew J Sked
(74) *Attorney, Agent, or Firm*—Akerman Senterfitt

(57) ABSTRACT

A solution for determining the accuracy of a speech recognition system. A first graphical user interface (GUI) is provided for selecting a transaction log. The transaction log has at least one entry that specifies a speech recognition text result. A second GUI is also provided for selecting at least one audio segment corresponding to the entry. The second GUI includes an activatable icon for initiating transcription of the audio segment through a reference speech recognition engine to generate a second text result.

24 Claims, 6 Drawing Sheets

| Manual Listen | Application Voice Server 1 | Result 1 | Application Voice Server 2 | Result 2 |
|---|---|---|---|---|
| Last requested route | LAST REQUESTED ROUTE | OK | LAST REQUESTED ROUTE | OK |
| yes | YES | OK | YEAH | OK |
| go to step six | GO TO STEP eighteen | FAIL | GO TO SLEEP | FAIL |
| go to step seven | GO TO STEP seven | OK | GO TO STEP eleven | FAIL |
| N/A | [spoke too soon] | N/A | [ ] | N/A |
| last requested route | [timeout] | FAIL | LAST REQUESTED ROUTE | OK |
| go to step eight | [silence] | FAIL | GO TO STEP EIGHT | OK |

FIG. 3

| What was said | Total Count | OK Count | Fail Count | N/A Count |
|---|---|---|---|---|
| Last requested route | 7 | 6 | 1 | 0 |
| yes | 27 | 21 | 6 | 0 |
| go to step six | 1 | 0 | 1 | 0 |
| go to step seven | 2 | 2 | 0 | 0 |
| N/A | 4 | 0 | 0 | 4 |
| go to step eight | 1 | 0 | 1 | 0 |

Receive Data files for:

Month        Day         Year
[Jan ↓]      [01 ↓]      [2001 ↓]          600
  605         610         615

620— [Next >]        [Cancel X] —625

FIG. 6

Listen Audio Voice file:                    705
710— [TMD200108100950188.1]  [Browse...]    700

Transcribed Text:  [          ] —715

[Play >]  [Next >]  [< Back]  [Cancel X]
  720     725      730       735

FIG. 7

GRAPHICAL USER INTERFACE FOR DETERMINING SPEECH RECOGNITION ACCURACY

BACKGROUND OF THE INVENTION

1. Technical Field

This invention relates to the field of speech recognition, and more particularly, to determining the accuracy of a speech recognition system.

2. Description of the Related Art

Speech recognition is the process by which an acoustic signal received by microphone is converted to a set of text words, numbers, or symbols by a computer or a microprocessor based device. These recognized words may be used in a variety of computer-based software applications for purposes such as document preparation, data entry, and command and control. Improvements to speech recognition systems provide an important way to enhance user productivity.

Speech recognition systems can model and classify acoustic signals to form acoustic models, which are representations of basic linguistic units referred to as phonemes. Upon receiving and digitizing an acoustic speech signal, the speech recognition system can analyze the digitized speech signal, identify a series of acoustic models corresponding to the speech signal, and derive a list of potential word candidates based upon the identified series of acoustic models. The speech recognition system also can determine a measurement reflecting the degree to which the potential word candidates phonetically match the digitized speech signal.

Speech recognition systems further can analyze the potential word candidates with reference to a contextual model. This analysis can determine a probability that one of the word candidates accurately reflects received speech based upon previously recognized words. The speech recognition system can factor subsequently received words into the probability determination as well. The contextual model, often referred to as a language model, can be developed through an analysis of many hours of human speech. Typically, the development of a language model can be domain specific. For example, a language model can be built reflecting language usage within a telephony context, a legal context, a medical context, or for a general user context.

The accuracy of speech recognition systems can be dependent on a number of factors. One such factor can be the audio environment in which speech is detected. The audio environment can significantly affect the resulting quality of the speech audio signal. User speech obtained from high noise environments, for example automobiles or public places such as where one communicates with a speech recognition system using a public telephone, can include a significant amount of environmental noise. This can lead to poor speech recognition. Further, telephony systems often utilize low quality audio signals to represent speech. The use of low quality audio signals within a voice processing system can exacerbate the aforementioned problem, as a low quality audio channel may result in noise which overpowers the user speech.

Another factor that can significantly affect the accuracy of a speech recognition system is the configuration of the speech recognition system itself. System configuration can be particularly relevant with regard to speech recognition systems which operate in diverse audio environments and/or audio environments having a significant amount of noise.

SUMMARY OF THE INVENTION

The invention disclosed herein provides a solution for guiding a user through a series of graphical user interfaces (GUIs) to determine the accuracy of a speech recognition system. According to the present invention, a speech recognition system transaction log can be examined in addition to the audio segments associated with the transaction log. The audio can be processed by a second speech recognition system to determine a second set of recognition results from the recorded audio segments. Accordingly, the output of the two speech recognition systems can be compared to determine a variety of statistical accuracy metrics.

The invention provides a first GUI for selecting a transaction log. The transaction log has at least one entry that specifies a speech recognition text result. A second GUI also can be provided for selecting at least one audio segment corresponding to the entry. The second GUI is automatically presented upon a transaction log being selected and includes an activatable icon for initiating transcription of the audio segment through a reference speech recognition engine to generate a second text result. A input portion for receiving user corrected transcribed text can also be provided in the second GUI.

A third GUI, which provides one or more fields to facilitate associating the audio segment with at least one condition, also can be provided. The condition can be stored in the transaction log and associated with the entry. Specifically, the fields can identify a person generating the audio segment, a gender of the person generating the audio segment, and ambient sounds influencing a recognizability of the audio segment. For example, the ambient sounds identified can be weather generated and/or background noise.

A fourth GUI also can be provided that includes one or more indicators to show an operational status of a software application used in determining the accuracy of a speech recognition system. Lastly, a fifth GUI can be provided to display the text result and the second text result, as well as statistical data.

BRIEF DESCRIPTION OF THE DRAWINGS

There are shown in the drawings embodiments which are presently preferred, it being understood, however, that the invention is not limited to the precise arrangements and instrumentalities shown.

FIG. 3 is a table illustrating sample data which can be compiled by the system of FIG. 2 in accordance with the inventive arrangements disclosed herein.

FIG. 4 is a table illustrating sample statistical metric calculations as determined in accordance with the inventive arrangements disclosed herein.

FIG. 6 is a schematic diagram showing an example graphical user interface for selecting a transaction log in accordance with the inventive arrangements disclosed herein.

FIG. 7 is a schematic diagram showing an example graphical user interface for selecting an audio segment in accordance with the inventive arrangements disclosed herein.

DETAILED DESCRIPTION OF THE INVENTION

The invention disclosed herein provides a solution for determining the accuracy of a speech recognition system. According to the present invention, a speech recognition system transaction log can be examined in addition to the audio segments associated with the transaction log. The audio can be processed by a second speech recognition system to determine a second set of recognition results from the recorded audio segments. Accordingly, the output of the two speech recognition systems can be compared to determine a variety of statistical accuracy metrics. A user can be guided through this process using a series of GUIs.

Figure 1:
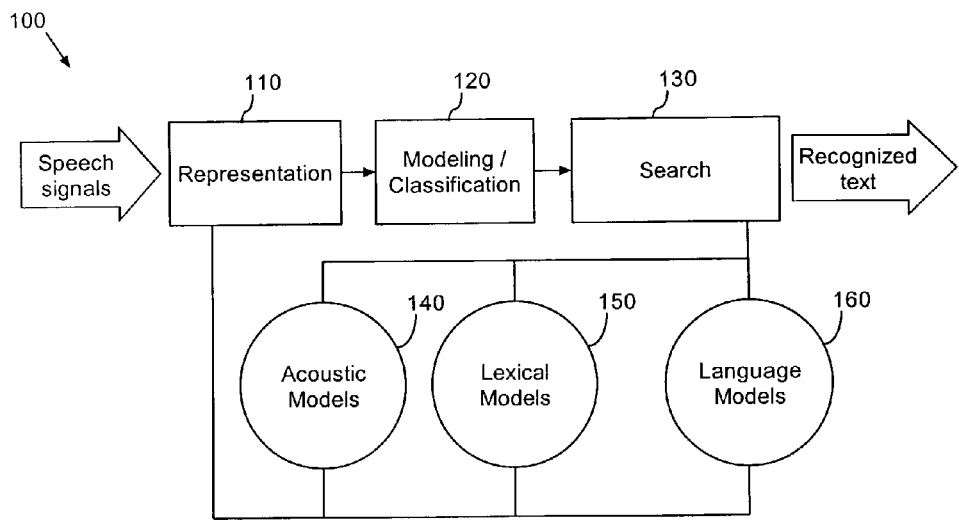
FIG. 1 is a block diagram showing typical components which can be included within a speech recognition engine.

FIG. 1 is a block diagram showing typical components of a speech recognition engine 100 of a speech recognition system. Those skilled in the art will recognize that a speech recognition system can include one or more other applications (not shown) configured to interact with the speech recognition engine 100. For example, the applications can provide graphical interfaces for editing recognized text, generate dialogs with users, or answer and manage telephone calls from users. In any case, the speech recognition engine 100 can be included within a desktop speech recognition system, an interactive voice response (IVR) unit, or a distributed computing environment.

As shown in FIG. 1, the speech recognition engine 100 receives a digitized speech signal. The signal can be subsequently transformed in representation block 110 into a useful set of data by sampling the signal at some fixed rate, typically every 10-20 msec. The representation block 110 can be configured to produce a new representation of the audio signal which can be used in subsequent stages of the voice recognition process to determine the probability that the portion of the waveform just analyzed corresponds to a particular phonetic event. This process is intended to emphasize perceptually important speaker independent features of the speech signals received from the operating system. In modeling/classification block 120, the speech signals can be processed further to adapt speaker-independent acoustic models to those of the current speaker if available. Finally, in search block 130, search algorithms can be used to guide the search engine to the most likely words corresponding to the speech signal. The search functionality of block 130 can be facilitated with the aid of acoustic models 140, lexical models 150, and language models 160.

Figure 2:
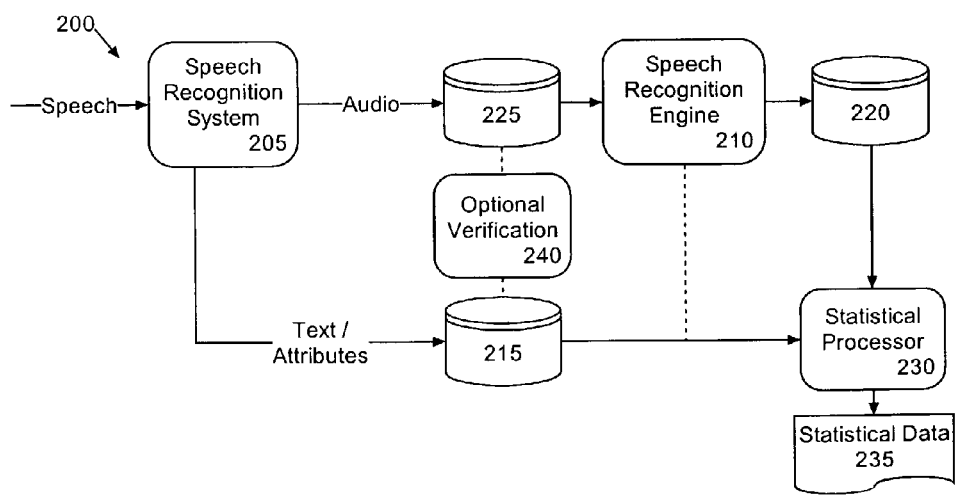
FIG. 2 is a schematic diagram illustrating a system for determining the accuracy of a speech recognition system in accordance with the inventive arrangements disclosed herein.

FIG. 2 is a schematic diagram illustrating a system 200 for determining the accuracy of a speech recognition system in accordance with the inventive arrangements disclosed herein. As shown in FIG. 2, the system 200 can include a speech recognition system 205 and a speech recognition engine 210. The speech recognition system 205 can be any of a variety of speech recognition systems such as a desktop system, a back-end processing system, for example the variety which typically executes within a speech server over a communications network, and/or an IVR system. Notably, the speech recognition system 205 can be any speech recognition system which is capable of generating a transaction log to be described herein in greater detail.

The speech recognition system 205 can be communicatively linked to a data store 215. The data store 215 can include a transaction log detailing the various speech recognition tasks and outputs of the speech recognition system 205. For example, as the speech recognition system 205 converts text to speech, the speech recognition system 205 can make entries within the data store 215. The entries can specify text recognition results as well as attributes describing the recognition results. For instance, the attributes can specify date and time information relating to when the user spoken utterance was received and/or recorded, and a telephone line and/or voice channel over which the user spoken utterance was received if implemented within a telephony speech recognition system. If the user is responding to a particular voice prompt, that information can be stored as well.

As the speech recognition system 205 performs each recognition task, any detected problems also can be noted within the entry. For example, in cases where the user spoke over a prompt the system can note the problem. The transaction log further can note whether the quality of the received audio was too poor for accurate recognition or whether any speech was detected during the user response period. The transaction log also can include information detailing the configuration of the speech recognition system 205. For example, any selected options, particular reference models such as acoustic or linguistic models or sound processing filters, any of which may changed to suit a particular audio environment, can be detailed within the transaction log.

As the speech recognition system 205 receives user spoken utterances, either the speech recognition system 205 itself, or another application program can store the audio segments within the audio data store 225. That is, audio segments or the actual user speech can be recorded and stored within the audio data store 225. For example, audio segments can be specified as a series of individual audio files. Accordingly, each audio segment can specify or be associated with information stored in the transaction log such that the entries in the transaction log can be correlated with corresponding audio segments. For example, according to one embodiment of the invention, audio files can be stored within a directory structure corresponding to date information. Alternatively, the name of an audio segment can be explicitly stored within the entries of the transaction log.

The speech recognition engine 210 can serve as a reference system which can be configured to function substantially similar to the speech recognition system 205. The speech recognition engine 210 can include configuration parameters which can be set to reflect the configuration parameters of the speech recognition system 205. For example, if the speech recognition system 205 is intended to be configured for use within a noisy audio environment and therefore employ particular acoustic models, threshold levels, and filtering, the speech recognition engine 210 also can be configured in a similar manner to provide an indication as to how the speech recognition system 205 is behaving. Still, the configuration and parameters of the speech recognition engine 210 can be altered to determine whether alternative configurations would provide better recognition results.

The speech recognition engine 210 can be communicatively linked to the audio data store 225 such that the speech recorded within the audio data store 225 can be made available to the speech recognition engine 210 for processing and recognition. The recognition results from the recognition engine 210 can be stored within a data store 220 to which the speech recognition engine 210 is communicatively linked. Accordingly, the data store 220 can include a transaction log for the speech recognition engine 210. The various attributes of the entries, however, can be determined from the audio segments themselves, or can be obtained by parsing the transaction log of the speech recognition system 205 and importing any such parameters. Hence, the speech recognition engine 210 is shown as having access to the data store 215, and thus the transaction log of the speech recognition system 205, via a dashed line. In any case, the recognition results and corresponding attributes can be used to correlate the recognition results of the speech recognition engine 210 with those of the speech recognition system 205 for comparison purposes.

The statistical processor 230 can access the data stores 215 and 220, and therefore the transaction logs of the speech recognition system 205 and the speech recognition engine 210. For example, the statistical processor can include any scripts necessary to parse the transaction log and extract the recognition results and various attributes. The statistical processor 230 can be configured to generate a variety of statistical metrics depicted by statistical data 235.

For example, the statistical data 235 can include the ratio of successful recognitions to the total number of recognitions, the number of successful recognitions to the total number of recognitions excluding the failed recognitions due to uncontrollable environmental elements, the ratio of failed recognitions to the total number of recognitions, the ratio of failed recognitions to the total number of recognitions minus the number of failed recognitions due to uncontrollable environmental elements, and the ratio of failed recognitions due to uncontrollable environmental elements to the total number of recognitions. The statistical processor 230 also can determine the number of attempted recognitions of unique words, the number of successful and unsuccessful recognitions of unique words, and the number of failed recognitions due to uncontrollable environmental elements.

Notably, the transaction log generated by the speech recognition system 205 can be edited through an optional and manual verification procedure referenced as item 240. In particular, the present invention allows test personnel to manually verify the recognition results of the speech recognition system 205 by listening to the audio segment. The test personnel can manually edit the transaction log to indicate whether the text result is an accurate representation of a corresponding audio segment. Moreover, the test personnel may enter a correct text result for particular audio segments after first listening to the segment. Thus, not only can the present invention generate statistical information from a comparison of a field speech recognition system to a reference system, the present invention further can measure the accuracy of both against a correct text recognition result as determined through a manual process.

FIG. 3 is a table 300 illustrating sample data which can be compiled by the system of FIG. 2 in accordance with the inventive arrangements disclosed herein. As shown in FIG. 3, the table includes a "Manual Listen" column indicating the text determined from manually listening to an audio segment to identify the words and/or phrases spoken by a user. The second column entitled "Application Voice Server 1" lists the recognition results as determined by a speech recognition system, for example, one that is operating in the field. The third column entitled "Result 1" indicates whether the text results listed under "Application Voice Server 1" are correct when compared with the manually verified text. The fourth column entitled "Application Voice Server 2" lists the recognized text as determined from a reference speech recognition engine, for example one operating within a controlled environment such as a lab. The fifth column entitled "Result 2" indicates whether the recognition results listed under "Application Voice Server 2" are correct when compared with the manually derived text.

Although not shown, the table can include additional information such as whether the recognition results listed under "Application Voice Server 1" are correct when compared with the recognition results listed under "Application Voice Server 2". Notably, the table 300 also specifies when no speech was detected as indicated in the "Application Voice Server 1" column by "[timeout]" and as indicated in the "Application Voice Server 2" column by "[ ]". For example, such can be the case where, as determined by the field speech recognition system, an audio signal includes too much noise for reliable recognition to occur. Other error conditions also can be noted such as where the user speaks over a voice prompt as indicated by "[spoke too soon]" and where only silence is detected as indicated by "[silence]".

FIG. 4 is a table 400 illustrating sample statistical metric calculations as determined in accordance with the inventive arrangements disclosed herein. As shown, the statistical information can include the total number of times a particular phrase was received, the number of times the phrase was correctly recognized, the number of times the phrase was recognized incorrectly, and a count specifying the number of times a result was not available or not applicable.

Figure 5:
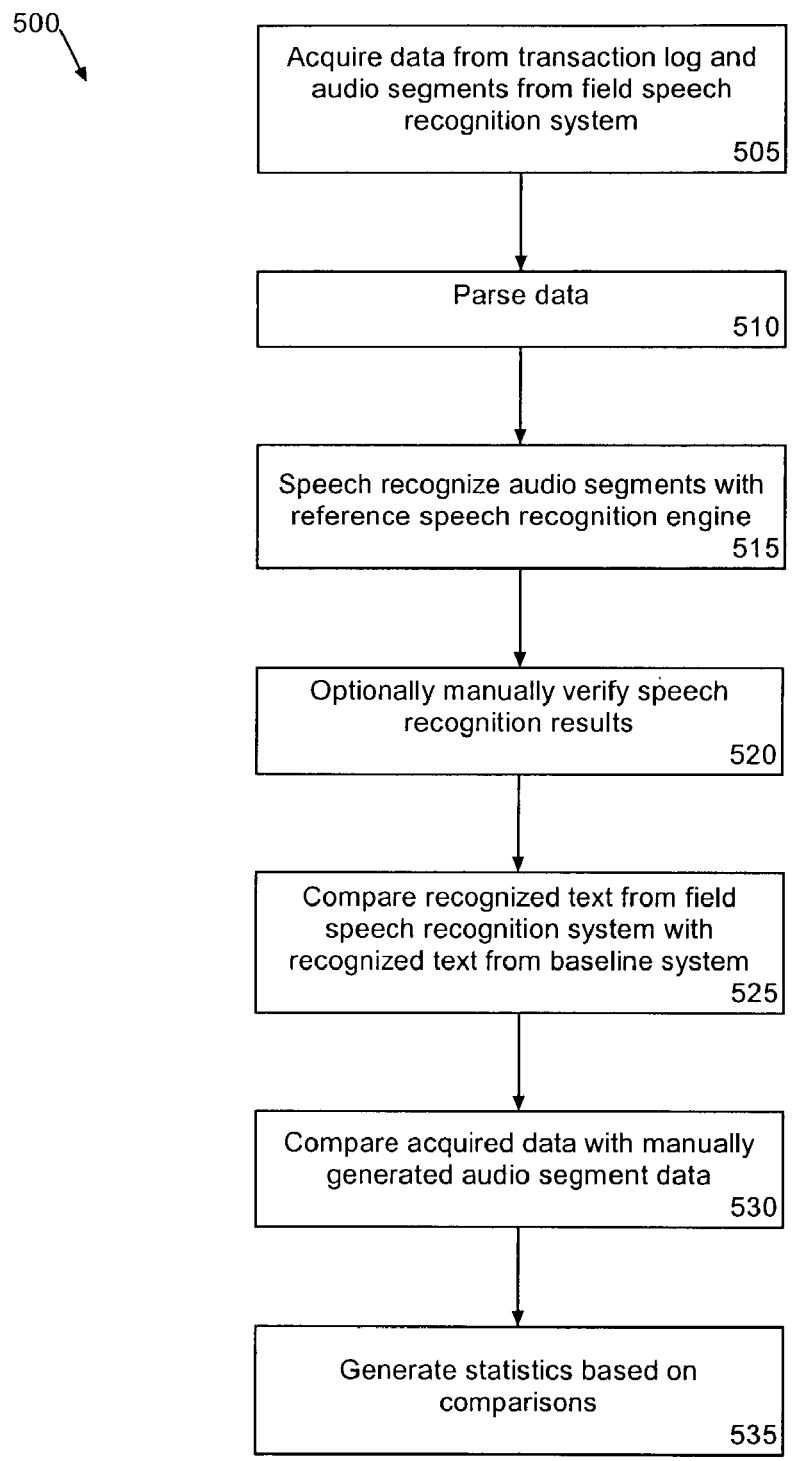
FIG. 5 is a flow chart illustrating an exemplary method for determining speech recognition accuracy statistics in accordance with the inventive arrangements disclosed herein.

FIG. 5 is a flow chart illustrating an exemplary method 500 for determining speech recognition accuracy statistics in accordance with the inventive arrangements disclosed herein. The method can begin in a state wherein a field speech recognition system has compiled a transaction log specifying text results and parameters such as date and time information and any other configuration parameters and failure conditions the speech recognition system is capable of logging. Audio segments for the various recognition results also can be stored.

In step 505, the data from the transaction log and audio segments can be accessed. In step 510, the transaction log can be parsed to extract the recognition results and attributes. For example, the transaction log can be parsed using one or more scripts which can extract information and convert the information to a usable format. The data can be formatted such that users of the software, for example test personnel, can more easily view and edit the information during a manual verification of the recognition results. Additionally, the data can be conditioned for comparison with recognition results as determined by the reference speech recognition engine. As mentioned, from the transaction log, information such as recognition results, date and time information for recognition results, audio segment information, as well as error conditions detected by the speech recognition system including excess noise in the audio segment (low signal-to-noise ratio) or the user speaking over prompts can be determined. Additionally, audio segments can be associated with corresponding transaction log entries.

In step 515, the audio segments can be provided as input to a reference speech recognition engine within a controlled computing and/or audio environment. The reference speech recognition engine can process the audio segments to determine recognized text from the audio segment inputs. In step 520, test personnel can manually verify the actual spoken words of the audio segments being analyzed. As mentioned, the test personnel can listen to the audio segments and transcribe the user spoken utterances. The manually transcribed text can be included with information extracted in step 510. Notably, during the manual verification process, the test personnel further can make note of additional details discernable from the audio recording.

The test personnel can note conditions which the field speech recognition system may not be able to detect, such as the particular audio environment in which the recording was made. For example, noise sources such as tire and wind noise in an automobile can be noted. Further, any ambient conditions can be noted, such as weather related noise sources and other background noise sources, for example noise detected over public telephones.

The test personnel also can note the gender of the user and whether the user had a noticeable accent. In an arrangement where the voice of a particular user is frequently encountered in the audio segments, test personnel can note an identifier to associate the audio segment with that particular user. The information noted by the test personnel can be specified as a code, for example, such that the statistical processing can reflect the impact of any noted factors determined through the manual transcription process.

In step 525, the recognized text as determined by the field speech recognition system can be compared to the recognized text as determined by the reference speech recognition engine. In step 530, the recognized text from both the field speech recognition system and the reference speech recognition engine can be compared to the manually derived text. Accordingly, in step 535, statistical metrics detailing the recognition performance of the speech recognition system can be determined.

Through an analysis of the statistical metrics, determinations can be made as to whether the field speech recognition system is properly configured for the audio environments from which the speech recognition system receives speech. As the reference speech recognition engine can be configured similar to, or the same as the field speech recognition system, determinations can be made as to whether recognition errors resulted from improper system configuration, uncontrollable environmental factors, or user error. Notably, the audio segments also can be processed to either insert and/or remove particular audio artifacts or audio characteristics for purposes of testing and comparison of the field speech recognition system and the reference speech recognition engine.

FIGS. 6 through 9 illustrate an automated manner of guiding a user through a series of graphical user interfaces (GUIs), commonly referred to as a wizard. The GUIs can incorporate a plurality of controls, such as text fields, activatable icons, buttons, etc. for navigating and entering information into files. Referring to FIG. 6, a diagram of a GUI 600 for user selection of a transaction log in accordance with the inventive arrangements is shown. For example the directory structure of the transaction log can be broken down by date. Accordingly, the GUI 600 can present a "Month" selection field 305, a "Day" selection field 610, and a "Year" selection field 615. Users of the GUI 600, such as the test personnel, can select a specific transaction log based upon the date the transaction log was generated. In another arrangement, the directory structure can be broken down by file names. Accordingly, a "File Name" selection field can be provided for retrieving transaction logs. Once the file name, or month, day and year, are entered into the respective selection fields, a test person can select a "Next" activatable icon 620 to proceed with the operation or select a "Cancel" activatable icon 625 to cancel the operation.

When the "Next" activatable icon 620 is selected, a transaction selection GUI 700, as shown in FIG. 7, can be presented for user selection of a specific transaction log entry. For example, a "Browse" activatable icon 705 can be selected to present a list of transaction log entries within the selected transaction log. Upon a user of the GUI 700 selecting a specific entry, for example with a pointer, an identifier for the selected entry can be displayed in the identifier field 710. Further, the recognized text resulting from the audio segment being processed by the reference speech recognition engine can be populated into the "Transcribed Text" field 715. In accordance with the process previously described for the manual verification process, the test person can select the "Play" activatable icon 720 to play the audio segment. If the recorded speech of the audio segment played does not match the recognized text, the test person can manually correct the result in the "Transcribed Text" field 715.

The test person can navigate forwards and backwards through the transaction log entries using the "Next" and "Back" activatable icons, 725 and 730, respectively. Further, the test person can cancel the operation with the "Cancel" activatable icon 735. When the "Next" activatable icon 725 is selected, a file association GUI 800, as shown in FIG. 8, can be presented.

Figure 8:
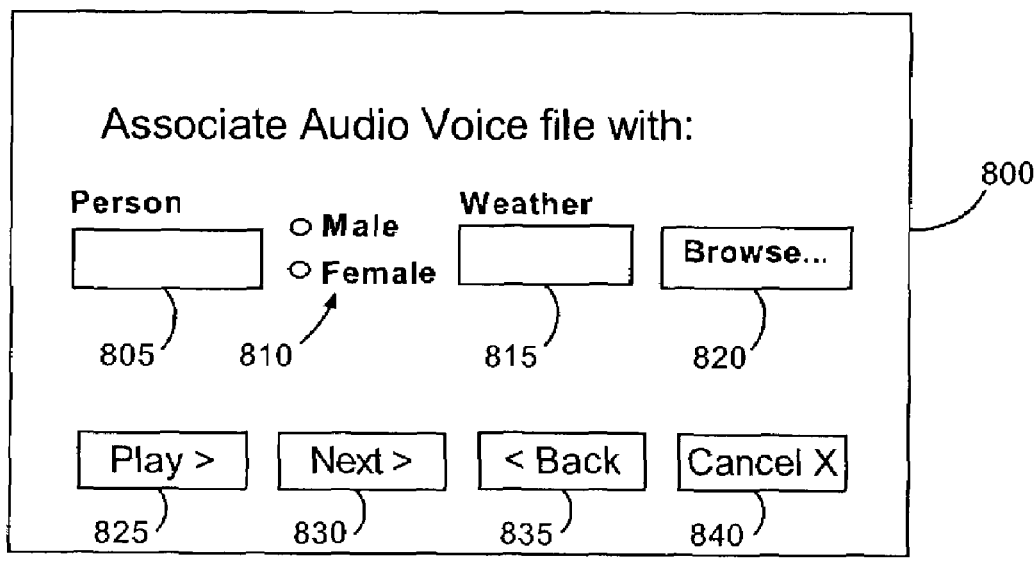
FIG. 8 is a schematic diagram showing an example graphical user interface for associating properties with an audio segment in accordance with the inventive arrangements disclosed herein.
Figure 9:
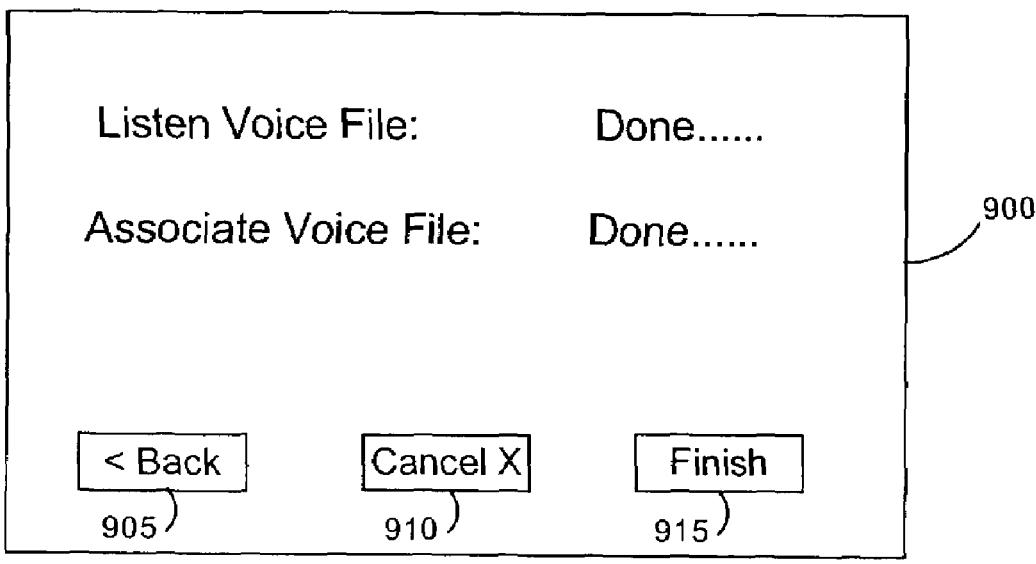
FIG. 9 is a schematic diagram showing an example graphical user interface for indicating a status of operations performed in accordance with the inventive arrangements disclosed herein.

The file association GUI 800 of FIG. 8 can be used to associate a particular audio segment with a condition influencing the audio quality. As previously noted, the condition can be a particular audio environment in which the recording was made, as well as any uncontrollable environmental factors such as excess noise which may be inherent within particular audio environments. For example, the particular user can be noted in the "Person" field 805, the gender can be noted in the gender selection boxes 810, and the weather conditions can be noted in the "Weather" field 815.

The conditions related to each audio segment can be noted immediately after transcription the audio segment. Alternatively, the conditions for the individual audio segments can be noted after transcription of all of the audio segments in a particular transaction log has been completed. In this embodiment, the "Browse" activatable icon 820 can be used to select a particular audio segment. Further, the "Next" and "Back" activatable icons, 830 and 835, respectively, can be used to navigate the GUI's to navigate audio segments to make a selection. Once an audio segment is selected, the "Play" activatable icon 825 can be selected to initiate audio playback of a selected audio segment and a test person can listen to and interpret the audio segment to determine the corresponding conditions. The test person can select the "Cancel" activatable icon 840 to cancel the operation.

Finally, a status GUI 900 can be presented to provide the test person with the operational status a software application used in determining the accuracy of a speech recognition system. For example, the status of whether an audio segment file has been played and whether the voice file has been associated with a condition can be indicated. The status GUI 900 can further provide a user with a "Back" activatable icon 905 to navigate back to previous GUIs, a "Cancel" activatable icon 910 to cancel the operation, and a "Finish" activatable icon 915 to complete the process. Additionally, GUIs can be provided to display the information of FIGS. 3 and 4, for example in a spreadsheet format, table, listing, etc. For example, GUIs for showing a comparison of a recognized text result, a second recognized text result, and a manually corrected text result, as well as statistical data.

Those skilled in the art recognize that the various controls shown in the GUIs disclosed herein are for purposes of illustration only. Accordingly, different configuration of text fields, activatable icons, radio buttons, drop down boxes, etc. can be used and the present invention is not limited by the specific controls provided.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of determining the accuracy of a speech recognition system comprising:
    providing a first graphical user interface (GUI) for selecting a transaction log wherein said transaction log has at least one entry, said entry specifying a speech recognition text result and a plurality of corresponding attributes comprising a first attribute specifying a sound processing filter associated with said audio segment, a second attribute specifying a configuration of a speech recognition system generating said speech recognition text result, a third attribute specifying an acoustic model on which said speech recognition text result is based, and a fourth attribute specifying a linguistic model on which said speech recognition text result is based; and
    providing a second GUI for selecting at least one audio segment corresponding to said entry;
    wherein said second GUI comprises an activatable icon for initiating transcription of said audio segment through a reference speech recognition engine to generate a second text result.

2. The method of claim 1, wherein said second GUI comprises an input portion for receiving user corrected transcribed text.

3. The method of claim 1, further comprising:
    providing a third GUI, wherein said third GUI comprises one or more controls to associate said audio segment with at least one condition.

4. The method of claim 3, wherein said condition specifies at least a person having generated said audio segment, a gender of said person, and ambient sounds influencing a recognizability of said audio segment.

5. The method of claim 4, wherein said ambient sounds are at least one of weather generated sound and background noise.

6. The method of claim 3, wherein said condition is stored in said transaction log and associated with said entry.

7. The method of claim 1 wherein, said second GUI is automatically presented upon a transaction log being selected.

8. The method of claim 1, further comprising the step of providing a fourth GUI, wherein said fourth GUI comprises one or more indicators to show an operational status of a software application used in determining the accuracy of a speech recognition system.

9. The method of claim 1, further comprising providing a fifth GUI displaying said text result and said second text result.

10. The method of claim 9, wherein said fifth GUI further displays manually entered text corresponding to said audio segment.

11. The method of claim 9, wherein said fifth GUI further displays data.

12. The method of claim 11 wherein said data is statistical data.

13. A machine-readable storage, having stored thereon a computer program having a plurality of code sections executable by a machine for causing the machine to perform the steps of:
    providing a first graphical user interface (GUI) for selecting a transaction log wherein said transaction log has at least one entry, said entry specifying a speech recognition text result and a plurality of corresponding attributes comprising a first attribute specifying a sound processing filter associated with said audio segment, a second attribute specifying a configuration of a speech recognition system generating said speech recognition text result, a third attribute specifying an acoustic model on which said speech recognition text result is based, and a fourth attribute specifying a linguistic model on which said speech recognition text result is based; and
    providing a second GUI for selecting at least one audio segment corresponding to said entry;
    wherein said second GUI comprises an activatable icon for initiating transcription of said audio segment through a reference speech recognition engine to generate a second text result.

14. The machine readable storage of claim 13, wherein said second GUI comprises an input portion for receiving user corrected transcribed text.

15. The machine readable storage of claim 13, further comprising:
    providing a third GUI, wherein said third GUI comprises one or more controls to associate said audio segment with at least one condition.

16. The machine readable storage of claim 15, wherein said condition specifies at least a person having generated said audio segment, a gender of said person, and ambient sounds influencing a recognizability of said audio segment.

17. The machine readable storage of claim 16, wherein said ambient sounds are at least one of weather generated sound and background noise.

18. The machine readable storage of claim 15, wherein said condition is stored in said transaction log and associated with said entry.

19. The machine readable storage of claim 13, said second GUI is automatically presented upon a transaction log being selected.

20. The machine readable storage of claim 13, further comprising the step of providing a fourth GUI, wherein said fourth GUI comprises one or more indicators to show an operational status of a software application used in determining the accuracy of a speech recognition system.

21. The machine readable storage of claim 13, further comprising providing a fifth GUI displaying said text result and said second text result.

22. The machine readable storage of claim 21, wherein said fifth GUI further displays manually entered text corresponding to said audio segment.

23. The machine readable storage of claim 21, wherein said fifth GUI further displays data.

24. The machine readable storage of claim 23, wherein said data is statistical data.

\* \* \* \* \*